US011556629B2

(12) United States Patent
Guigan

(10) Patent No.: US 11,556,629 B2
(45) Date of Patent: Jan. 17, 2023

(54) METHOD FOR AUTHENTICATING A THREE-DIMENSIONAL SIGNATURE

(71) Applicant: Franck Guigan, Paris (FR)

(72) Inventor: Franck Guigan, Paris (FR)

( * ) Notice: Subject to any disclaimer, the term of this patent is extended or adjusted under 35 U.S.C. 154(b) by 96 days.

(21) Appl. No.: 16/962,801

(22) PCT Filed: Jan. 10, 2019

(86) PCT No.: PCT/FR2019/000002
§ 371 (c)(1),
(2) Date: Jul. 16, 2020

(87) PCT Pub. No.: WO2019/141915
PCT Pub. Date: Jul. 25, 2019

(65) Prior Publication Data
US 2021/0200855 A1    Jul. 1, 2021

(30) Foreign Application Priority Data

Jan. 16, 2018 (FR) ........................................ 1870038
Oct. 10, 2018 (FR) ........................................ 1871159

(51) Int. Cl.
*H04L 29/06* (2006.01)
*G06F 21/44* (2013.01)
(Continued)

(52) U.S. Cl.
CPC .............. *G06F 21/44* (2013.01); *G06V 20/46* (2022.01); *H04L 63/08* (2013.01)

(58) Field of Classification Search
CPC .................................. G06F 21/44; G06K 19/10
See application file for complete search history.

(56) References Cited

U.S. PATENT DOCUMENTS 9,058,535 B2 *  6/2015  Guigan ............ G06K 19/06037
2004/0112962 A1   6/2004  Farrall et al.

FOREIGN PATENT DOCUMENTS

FR      2973912          10/2012
FR      2973912 A3 *     10/2012    ............. G06F 21/36
(Continued)

OTHER PUBLICATIONS

International Search Report for International Application No. PCT/FR2019/000002 dated May 20, 2019, 3 pages.
(Continued)

*Primary Examiner* — Jason K Gee
(74) *Attorney, Agent, or Firm* — TraskBritt

(57) ABSTRACT

An authentication method involves comparing a 2D description of an authentication device, referred to as a subsequent description, with an original 2D description by choosing, from several previously established original 2D descriptions, a 2D description established from a point of view similar to the one used to establish the subsequent 2D description. Advantageously, the optical characteristics of the authentication device vary so little when it is viewed from neighboring points of view that the device can be recognized from most of the points of view, and the original 2D descriptions have been established from neighboring points of view, which form a substantially continuous domain. In an improved version, a three-dimensional description of the authentication device, referred to as a 3D description, is reconstructed from several original 2D descriptions, which makes it possible to predict the appearance thereof from a plurality of different points of view.

15 Claims, 1 Drawing Sheet

(51) Int. Cl.
*H04L 9/40* (2022.01)
*G06V 20/40* (2022.01)

(56) References Cited

FOREIGN PATENT DOCUMENTS

| FR | 2977349 | 1/2013 | | |
|---|---|---|---|---|
| FR | 2977349 A3 * | 1/2013 | ............. | G06F 21/36 |
| WO | 2012/136902 | 10/2012 | | |
| WO | WO-2012136902 A1 * | 10/2012 | ............. | G06F 21/36 |

OTHER PUBLICATIONS

International Written Opinion for International Application No. PCT/FR2019/000002 dated May 20, 2019, 5 pages.

\* cited by examiner

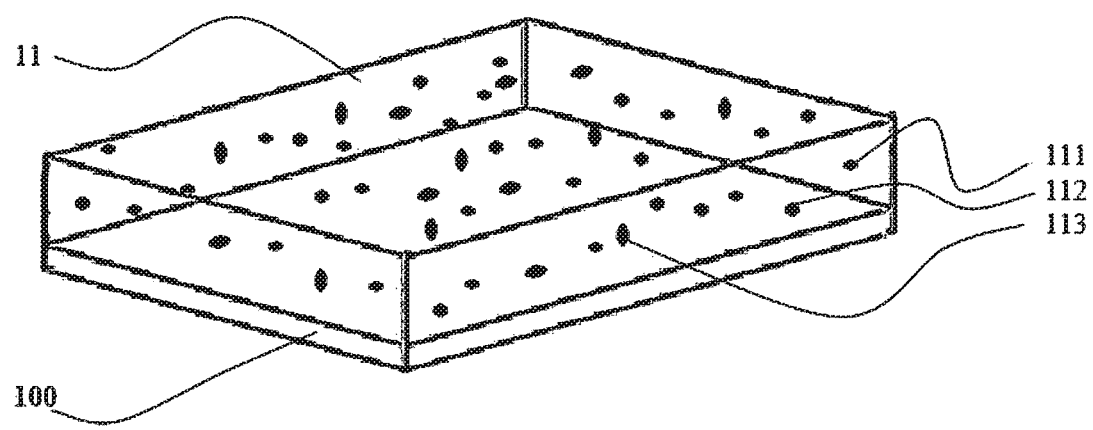

METHOD FOR AUTHENTICATING A THREE-DIMENSIONAL SIGNATURE

CROSS-REFERENCE TO RELATED APPLICATIONS

This application is a national phase entry under 35 U.S.C. § 371 of International Patent Application PCT/FR2019/000002, filed Jan. 10, 2019, designating the United States of America and published as International Patent Publication WO 2019/141915 A1 on Jul. 25, 2019, which claims the benefit under Article 8 of the Patent Cooperation Treaty to French Patent Application Serial No. 18/70038, filed Jan. 16, 2018 and French Patent Application Serial No. 18/71159, filed Oct. 10, 2018.

TECHNICAL FIELD

The present disclosure relates to an authentication method, which makes it possible to verify the authenticity of any object, for example, a printed document, an industrial product or a work of art, by comparing the features of one of its parts, referred to as an authentication device, with a record that was made previously. The present disclosure also allows secure authentication of markings, which are impossible to reproduce, for which the original must be on hand in order to carry out all kinds of transactions (e.g., payment, signature, identification, authorization).

BACKGROUND

The present disclosure relates to a refinement of PCT/FR2012/000096 from Franck Guigan [FR], which has a priority of Apr. 5, 2011 and was issued in the United States of America as U.S. Pat. No. 9,058,535.

In one of its implementations, this disclosure relates to an authentication method, which consists in establishing a description, referred to as a subsequent description, of an authentication device 1 comprising a set referred to as a coded entity 11, which in turn comprises light-disturbing elements referred to as disrupters 111, 112 et seq., and comparing this description with a description referred to as an original description of the authentication device 1, wherein the procedure makes it possible to establish the subsequent description and to make the comparison comprises determining, by a means that is referred to as a positioning means 7 and that cooperates with a recognizable graphic structure referred to as a marker 2, the position in three dimensions in which the acquisition means 3 is located with respect to the authentication device 1, in order to carry out a first acquisition from this position, referred to as an original point of view, and an acquisition referred to as an additional acquisition carried out from a point of view that is substantially different from the original point of view.

An object of the present disclosure is to widen the field in which the camera has to be placed in order to carry out the first acquisition, and to use this widening to allow online identification of persons using the authentication device as a personal identifier.

BRIEF DESCRIPTION OF THE DRAWINGS

The present disclosure will be better understood, and other objects, advantages and features thereof will become clearer upon reading the following description, which is illustrated by FIG. 1, which shows an authentication device of the authentication method according to the present disclosure, having a printing surface 100 and a marking 11 comprising a transparent layer in which disrupters 111, 112 et seq. are embedded.

DETAILED DESCRIPTION

The present invention relates to an authentication method which consists in establishing a description, referred to as a subsequent 2D description, of a set referred to as a marking (11), which in turn comprises light-disturbing elements referred to as disturbers (11, 112 et seq.), and comparing said subsequent 2D description with a previously established 2D description of said marking, referred to as an original 2D description, characterized in that a plurality of original 2D descriptions have been established which correspond to different points of view of said marking, referred to as adjacent points of view, and in that one such subsequent 2D description is compared with one of said original 2D descriptions which has been established from an acquisition carried out with a means referred to as an acquisition means from a point of view which is one of the closest to the point of view from which said subsequent 2D description of said marking is established, it being specified that a 2D description of a marking is hereinbefore understood to mean a description in two dimensions of the appearance of said authentication device from a given point of view.

The principle of the present disclosure involves establishing not one but a plurality of original 2D descriptions of the authentication device in order to have an original 2D description corresponding to a point of view close to that under which the device is observed during the authentication procedure, without the need to place the acquisition means at a precise location.

This technique of establishing a plurality of original 2D descriptions is already described in the above-mentioned document PCT/FR2012/000096, but with a different purpose: "It is also possible that a plurality of original descriptions of the authentication device 1, corresponding to different points of view or different types of lighting, may be stored in the database. This has the effect of increasing the number of possible combinations. In order to make fraud more difficult, this requires a plurality of comparisons to be made with a plurality of original descriptions, based on points of views or lighting characteristics that differ from one comparison to the next."

According to the present disclosure, a plurality of original 2D descriptions have been established from acquisitions carried out from different points of view defined by reference to the authentication device, but these points of view are adjacent, and a subsequent 2D description is compared with one of the original 2D descriptions established from an acquisition carried out from one of the points of view closest to the point of view from which the subsequent 2D description is established by reference to the authentication device. Advantageously, the original 2D description corresponding to the closest point of view is chosen, but this is not essential, as the subsequent 2D description can also be compared with a plurality of original 2D descriptions.

The authentication device may comprise an identifier such as a serial number, in the form of numbers and/or letters, or in the form of a barcode, but this is not required. On the other hand, it must comprise a set referred to as a marking 11, which in turn comprises light-disturbing elements referred to as disrupters 111, 112 et seq., which are features of the authentication device. This marking may be a hologram, for example, which is identical for a series of products, but it may also be a set of randomly arranged disrupters on or in the marking 11. It may also involve natural features of the object to be authenticated.

As with PCT/FR2012/000096, the disrupters may be details, even if not very visible, of the printing surface on which a mark or other identifier such as a serial number or barcode is printed. They can also be particles of any kind protected by a layer of varnish or printed on the reverse of a transparent printing surface. Alternatively, as shown in FIG. 1, the disrupters 111, 112 et seq. may be incorporated into a block of a transparent substance, e.g., a plastic card or a keychain.

The disrupters may be divided into subsets, which may be contiguous, the module concept being determined at the time at which the 2D description is established, for example, because an acquisition is made using a camera, which stores its information in the form of a checkerboard of juxtaposed pixels.

The advantage of the present disclosure is that of widening the field in which the camera must be placed in order to carry out an acquisition during the authentication procedure, to improve the comfort for the user.

Advantageously, the identification device is stabilized, i.e., its appearance varies sufficiently little when viewed from adjacent points of view close to a point of view referred to as an original point of view, such that the device can be recognized as sufficiently similar to the original description from most of the adjacent points of view. The set of points of view adjacent to an original point of view from which the device can be recognized in this way are hereinafter referred to as a "field of vision of an original point of view."

This can easily be achieved by a person skilled in the art, for example, according to one of the methods set out in the above-mentioned document PCT/FR2012/000096, with an optical diffuser or disrupters 111, 112 of which the surface diffuses the light it reflects, such as a frosted surface or microstructures such as a reflection hologram.

In order to increase user comfort during an authentication procedure, it is desirable that the fields of vision from an original point of view form a substantially continuous field. The user can then place the acquisition means almost anywhere in a fairly wide field.

It is advantageous to establish the comparison of a subsequent 2D description not with a single original 2D description, but with a plurality thereof. This requires a person skilled in the art to use suitable algorithms, for example, by retaining what is common between two original 2D descriptions established from a plurality of adjacent points of view, in order to deduce, by calculation, an original 2D description corresponding to an intermediate point of view.

This method can be refined by reconstructing a three-dimensional 2D description of the marking from a plurality of original 2D descriptions. There are presently numerous software programs available that make it possible to describe an object in three dimensions, and numerous file formats that are suitable for such an operation. The advantage is then that a person skilled in the art can predict the appearance of the authentication device from a plurality of different points of view, and the user can carry out an authentication procedure by placing the acquisition means in a location that was not initially foreseen.

Such a 3D description can be used to validate a subsequent 2D description from a single acquisition as well as to validate a plurality of subsequent 2D descriptions from a plurality of acquisitions, or a calculated subsequent description, which itself is also three-dimensional. During the authentication procedure, a slight shift of the means for acquisition of images, most often a smartphone, is sufficient to be able to carry out a plurality of acquisitions or such a three-dimensional acquisition using known methods. The fact that the smartphone is held in the hand is sufficient for this shift to be obtained naturally, but the user can obviously be asked to move the acquisition means if it is too immobile.

In a refined embodiment, the authentication procedure may comprise a plurality of successive acquisitions, either to quickly find one that is relevant for comparison with one of the original 2D descriptions, or to make a plurality of comparisons, or for both reasons. Advantageously these successive acquisitions constitute a video. This video can be transmitted as-is to a server referred to as an authentication server, or processed locally to extract one or more subsequent 2D descriptions. Advantageously, it is transmitted in real time to a server referred to as an authentication server. It is therefore not necessary to have a specific application to send this video to the authentication server since a standard messaging application that allows video can suffice (e.g., Snapchat, Messenger, etc.). It can also be analyzed in real time by the authentication device if the device includes a computer.

The method can include a step of indicating to the user a preferred point of view from which to carry out at least one of the subsequent acquisitions, or a plurality of points of view from which to successively carry out subsequent acquisitions.

Advantageously, the method comprises controlling the user's image acquisition device so as to give an instruction to turn the flash on or off.

The present disclosure makes it possible to carry out on-line identification of the user, while making it impossible for a hacker to capture the transaction on a network such as the Internet and to replay it afterwards, thus knowing the answers to the questions.

A plurality of original descriptions corresponding to different original points of view are stored in a server, which randomly selects certain points of view from among thousands of possible points of view around the marking 11, and asks the user to switch from one to the other in a randomly chosen sequence.

Each subsequent description established from one of the multiple points of view composing the trajectory of the acquisition means, with the flash permanently on and off, is used by the server algorithm to establish whether, depending on the distance between the point of view and the initial point of view, the difference between the appearance of the signature is acceptable or not.

Thus, there are billions of possible combinations of requested points of view and actual points of view viewed by the acquisition means. The hacker would have to find the original descriptions, which would be very difficult because they are not identical to the random points of view requested by the server. This makes it virtually impossible to replay a captured transaction.

The points of view from which acquisitions referred to as subsequent acquisitions are to be successively carried out are advantageously determined randomly.

The times at which the acquisition means should turn its flash on or off can also be determined randomly.

In a refined embodiment, a marking comprises two zones, one of which changes more in appearance than the other for the same shift in point of view. It comprises a first zone for acquisition by an acquisition means that can be held by hand, and a second zone for acquisition by an acquisition means of which the position can be better controlled. The second zone may be reserved for a more selective verification of the authenticity of the marking. An ATM, identifying the person wishing to make a cash withdrawal, will, for example, use the second zone, whereas a person wishing to establish, with his handheld smartphone, the identity of a person presenting himself at his home as a policeman or fireman will only use the first zone.

The acquisition means advantageously comprise a mechanical means making it possible to modify the point of view under which the marking is seen in order to establish a subsequent 2D description.

To prevent fraud, the authentication method can comprise a preliminary step, such as entering a PIN code, which has to be successfully completed so that a subsequent 2D description can be established. This PIN code may or may not be changeable. It may be indicated in the identifier or provided to the acquisition means when requested by the acquisition means.

The applications for embodiments of the present disclosure are the same as the applications disclosed in PCT/FR2012/000096.

The invention claimed is:

1. An authentication method, comprising:
  establishing a plurality of original 2D descriptions of a marking of an authentication device, the marking including a set of light-disturbing disrupters, the plurality of original 2D descriptions corresponding to different adjacent points of view of the marking, each of the original 2D descriptions of the marking being a description in two dimensions of an appearance of the marking from a given point of view;
  establishing a subsequent 2D description of the marking; and
  comparing the subsequent 2D description with a plurality of the original 2D descriptions corresponding to adjacent points of view.

2. The method of claim 1, wherein the subsequent 2D description is compared with an original 2D description of the plurality of original 2D descriptions corresponding to the point of view closest to the point of view from which the subsequent 2D description is established by reference to the authentication device.

3. The method of claim 1, further comprising reconstructing an original 3D description of the marking by calculation using the original 2D descriptions of the plurality.

4. The method of claim 3, further comprising using the original 3D description of the marking to determine a point of view of the subsequent 2D description.

5. The method of claim 1, further comprising establishing a plurality of successive, subsequent 2D descriptions of the marking from different points of view.

6. The method of claim 5, wherein establishing a plurality of successive, subsequent 2D descriptions of the marking from different points of view comprises acquiring a video of the marking.

7. The method of claim 6, further comprising transmitting the video to an authentication server.

8. The method of claim 7, further comprising transmitting the video to the authentication server in real time.

9. The method of claim 5, further comprising indicating to a user the plurality of points of view from which to establish the plurality of successive, subsequent 2D descriptions of the marking.

10. The method of claim 9, wherein the plurality of points of view from which the plurality of successive, subsequent 2D descriptions of the marking are to be established are determined randomly.

11. The method of claim 1, wherein an acquisition device of a user is used to establish the subsequent 2D description of the marking, the method further comprising controlling the acquisition device of a user to instruct the user to turn a flash on or off.

12. The method of claim 11, wherein times for switching the flash on and off are determined randomly.

13. The method of claim 1, wherein the marking comprises at least two zones, a first zone of the at least two zones exhibiting more change in appearance than a second zone of the at least two zones for a same shift in point of view.

14. The method of claim 1, further comprising using a mechanical device to modify a point of view from which the subsequent 2D description of the marking is established.

15. The method of claim 1, further comprising requiring a user to perform an authentication step, and allowing the establishment of the subsequent 2D description of the marking only upon successful completion of the authentication step by the user.

* * * * *